United States Patent
Grois et al.

(10) Patent No.: US 6,210,047 B1
(45) Date of Patent: Apr. 3, 2001

(54) METHOD OF FABRICATING A FIBER OPTIC CONNECTOR FERRULE

(75) Inventors: Igor Grois, Northbrook; Mark Margolin, Lincolnwood; Stephen Z. Migo, Woodridge, all of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/498,502

(22) Filed: Feb. 4, 2000

(51) Int. Cl.[7] .............................. G02B 6/00; G02B 6/36
(52) U.S. Cl. .................................................. 385/83
(58) Field of Search ................................. 385/53, 78, 77, 385/79, 80, 81, 82, 83–89, 147

(56) References Cited

U.S. PATENT DOCUMENTS

| | | | |
|---|---|---|---|
| 4,818,058 | 4/1989 | Bonanni | 350/96.2 |
| 4,865,413 | 9/1989 | Hubner et al. | 350/96.21 |
| 5,339,376 | 8/1994 | Kakii et al. | 385/71 |
| 5,430,819 | 7/1995 | Sizer, II et al. | 385/59 |
| 5,867,620 | * 2/1999 | Bunin et al. | 385/53 |
| 5,907,651 | * 5/1999 | Bunin et al. | 385/80 |
| 5,923,803 | * 7/1999 | Bunin et al. | 385/80 |
| 5,963,691 | * 10/1999 | Bunin et al. | 385/78 |

* cited by examiner

*Primary Examiner*—Akrn E. Ullah
(74) *Attorney, Agent, or Firm*—A. A. Tirva

(57) ABSTRACT

A method is disclosed for fabricating a connector ferrule for a fiber optic cable which includes at least one optical fiber. A pair of ferrule clamping members are provided and define a fiber passage therebetween for receiving the optical fiber and which define at least one pin passage therebetween of a given diameter. A ferrule body is formed about the clamping members. A spreader pin of a larger diameter than the given diameter is inserted into the pin passage to spread the clamping members and open the fiber passage. The optical fiber is inserted into the opened fiber passage, and the spreader pin is removed to allow the clamping members to close onto the optical fiber.

11 Claims, 3 Drawing Sheets

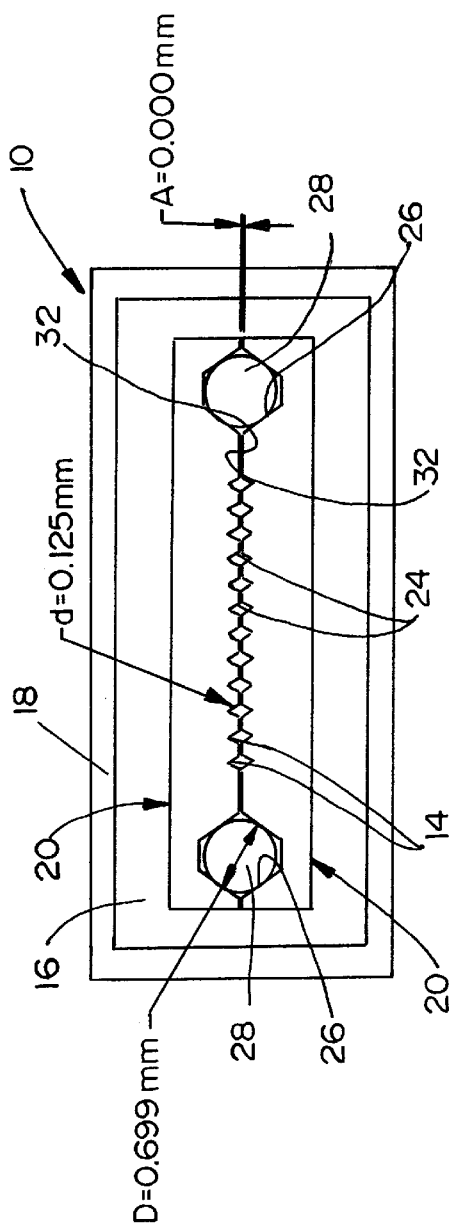
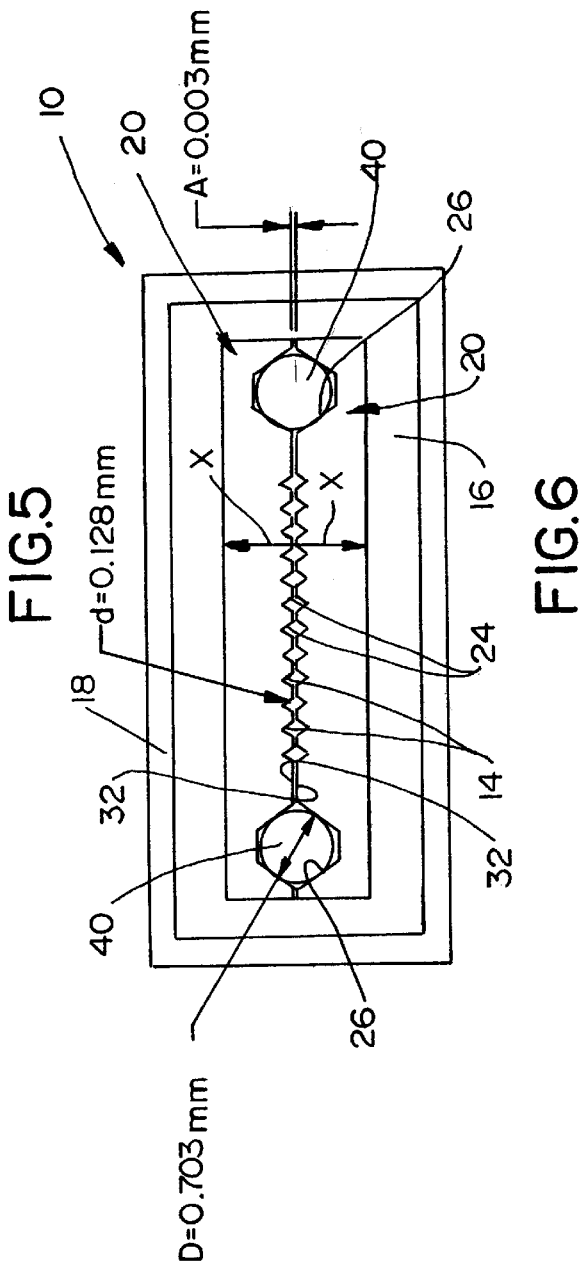

METHOD OF FABRICATING A FIBER OPTIC CONNECTOR FERRULE

FIELD OF THE INVENTION

This invention generally relates to the art of fiber optic connectors and, particularly, to a method of fabricating a connector ferrule.

BACKGROUND OF THE INVENTION

In fiber optic transmission systems, signals are transmitted along optical fibers by optical frequency waves (light) generated by such source as LED's, lasers and the like. Optical fibers typically are fabricated of glass materials and, as optical fiber circuitry developed, it became necessary to provide connecting devices which could couple one optical fiber to another, only in an end-to-end relationship.

A traditional procedure for making a connection between ends of optical fibers is to, first, remove a protective jacket from a given length of fiber at the end of the fiber to be joined. After the jacket is removed, a 250 micron (OD) buffer is exposed which can then be stripped to expose a 125 micron (OD) fiber. The fiber is then threaded through a passage in a ferrule where it is affixed in place by adhesive and/or crimping. The fiber is inserted so as to extend well beyond a front surface of the ferrule. The exposed fiber material is then cleaved and polished. Any remaining adhesive is removed. The ferrules then are assembled into a connector assembly which is intended to position the optical fibers with their optical axes in alignment for connection to the fibers of a mating connector or other appropriate connecting device.

A fiber optic ribbon cable has become increasingly popular to provide multiple channels in a single cable structure. An optical ribbon cable is similar to any other well known ribbon electrical cable to the extent that a plurality of generally parallel optical fibers or channels are disposed in a line or generally coplanar relationship. Terminating the optical fibers of a fiber optic ribbon cable is generally similar to the procedure described above. In general, the unitary protective jacket surrounding the line of fibers is removed so that the buffered fibers are exposed which are then stripped and the unprotected fibers project from the flat cable in a line. Typically, these individual fibers must be inserted into respective individual holes or passages in a prefabricated connector ferrule. The passages align the fibers at a predetermined spacing for coupling to the ends of the fibers in a complementary connector ferrule or other connecting device.

This terminating process of the individual fibers of a multi-fiber cable, creates a number of problems. First, because of the very thin size and extremely fragile nature of the fibers, it can be tedious to insert a fiber into a single aligning hole or passage. However, inserting a plurality of such fibers from a single cable into a plurality of passages can be extremely difficult. If a single fiber of the cable is broken, the stripped cable end and ferrule either must be discarded and/or reworked. Since these processes typically are carried out by hand, they can be rather inefficient and result in unnecessary expense.

In the prior art, placing individual fibers of a multi-fiber cable into individual holes or passages in a connector ferrule results in a high percentage of rejects. The ferrules must be inspected hole by hole. In addition to fibers being broken, the holes, themselves, may be too large or too small or not circular. Connector ferrules comprise bodies which are crystalline in nature, typically of ceramic material. However, they can be molded of plastic or like material. For multiple channel ferrules, the fiber-receiving holes or passages must be formed precisely to maintain proper form or alignment and spacing between the fibers to prevent tolerance problems causing transmission losses during mating.

The above alignment/tolerance problems are further complicated in connector assemblies wherein a pair of mating connector ferrules, themselves, are placed in the mating condition by two alignment pins. These alignment pins typically have one end of each pin extending into a passage of the connector ferrule, and the opposite end of the pin being inserted into a passage in the mating connector ferrule, with a chamfered lead-in on the pin for alignment. The problems of maintaining precise tolerances with the alignment pins and their passages must be added to the tolerance problems in maintaining precise spacing and alignment of the individual holes for the optical fibers of the fiber optic cable. It can be understood why there is such a high number of rejects during the fabrication of prior art connector ferrules. The present invention is directed to solving these problems in the fabrication of a multi-fiber ferrule.

SUMMARY OF THE INVENTION

An object, therefore, of the invention is to provide a new and improved method of fabricating a connector ferrule for a fiber optic cable. The invention is particularly applicable for terminating a multi-fiber optic cable which includes a plurality of generally parallel optical fibers, such as a fiber optic ribbon cable having the fibers in a straight line or coplanar relationship, but the invention is not limited to such multi-fiber cables.

In the exemplary embodiment of the invention, the method includes the steps of providing a pair of ferrule clamping members which define at least one fiber passage therebetween for receiving an optical fiber and which define at least one pin passage therebetween of a given diameter. A ferrule body is formed about the clamping members. A spreader pin larger than the given diameter is inserted into the pin passage to spread the clamping members and open the fiber passage. The optical fiber then is inserted into the opened fiber passage, and the spreader pin is removed to allow the clamping members to close onto the optical fiber.

As disclosed herein, the clamping members define a plurality of generally parallel fiber passages of diameters equal to or less than the outside diameters of optical fibers. The pin passage is of a given diameter for receiving a standard alignment pin projecting from the ferrule to align the ferrule with an appropriate complementary connecting device. The ferrule body is molded about the clamping members, and the spreader pin spreads the clamping members within the constraints of the molded body.

Still further, the clamping members herein are provided with opposing generally planar surfaces defining the fiber passages therebetween in a generally straight line for receiving the optical fibers of a fiber optic ribbon cable. The clamping members are provided with fiber half-passages in each of the opposing planar surfaces combining to form the complete fiber passages. One of said pin passages is spaced from each end of the line of fiber passages for receiving a pair of the spreader pins.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims.

The invention, together with its objects and the advantages thereof, may be best understood by reference to the following description taken in conjunction with the accompanying drawings, in which like reference numerals identify like elements in the figures and in which:

FIG. 5 is a front elevational view of the ferrule with a pair of standard alignment pins therein; and FIG. 6 is a view similar to that of FIG. 5, with a pair of spreader pins inserted into the pin passages between the clamping members.

DETAILED DESCRIPTION OF THE PREFERRED EMBODIMENT

Figure 1:
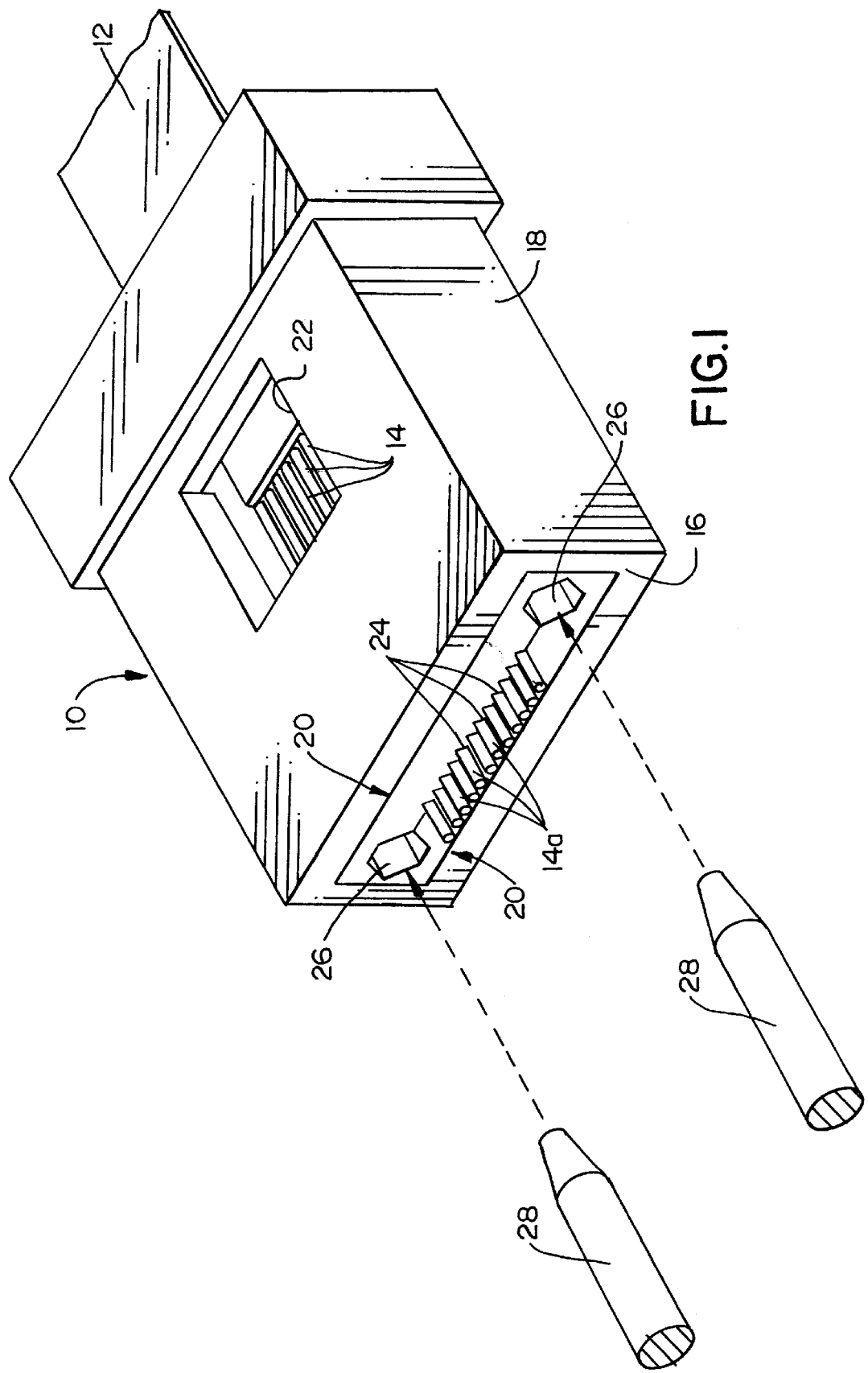
FIG. 1 is a perspective view of a connector ferrule fabricated in accordance with the concepts of the invention.

Referring to the drawings in greater detail, and first to FIG. 1, the invention is embodied in a method of fabricating a connector ferrule, generally designated 10, for terminating a fiber optic cable 12 which includes a plurality of generally parallel optical fibers 14. Cable 12 is shown herein as a flat or ribbon cable, whereby optical fibers 14 are disposed in a generally straight line. However, it should be understood that the concepts of the invention are equally applicable for other configurations of fiber optic cables. In addition, FIG. 1 shows ends 14a of optical fibers 14 projecting beyond a front mating face 16 of the ferrule. These fiber ends eventually would be cut-off and polished before the ferrule is operable for mating with another connector ferrule or other appropriate complementary connecting device.

With the above understandings, connector ferrule 10 includes a ferrule body 18 surrounding a pair of clamping members, generally designated 20, at the front end of the body. The body includes an opening 22 through which epoxy can be inserted to permanently fix the optical fibers within the ferrule. Clamping members 20 define a plurality of generally parallel fiber passages 24 therebetween and of diameters equal to or less than optical fibers 14 for receiving the optical fibers. With cable 12 being a ribbon cable, fiber passages 24 are arranged in a straight line. Clamping members 20 also define a pair of pin passages 26 therebetween and spaced outwardly from opposite ends of the line of fiber passages 24.

At this point, it should be understood that pin passages 26 are of given diameters for receiving a pair of alignment pins 28. In the fiber optic connector industry, the diameters of these alignment pins are of standard dimensions so that a variety of fiber optic connectors can be interchangeably mated. Therefore, within the concepts of the invention herein, pin passages 26 may be open passages of standard diameters for receiving a pair of alignment pins from a complementary connecting device, or a pair of alignment pins can be fixed within passages 26 and the pins being insertable into passages of the complementary connecting device. In the latter instance, the same epoxy that is inserted through opening 22 to fix fibers 14 in the ferrule may be used to fix the alignment pins within pin passages 26 of standard diameters.

Figure 2:
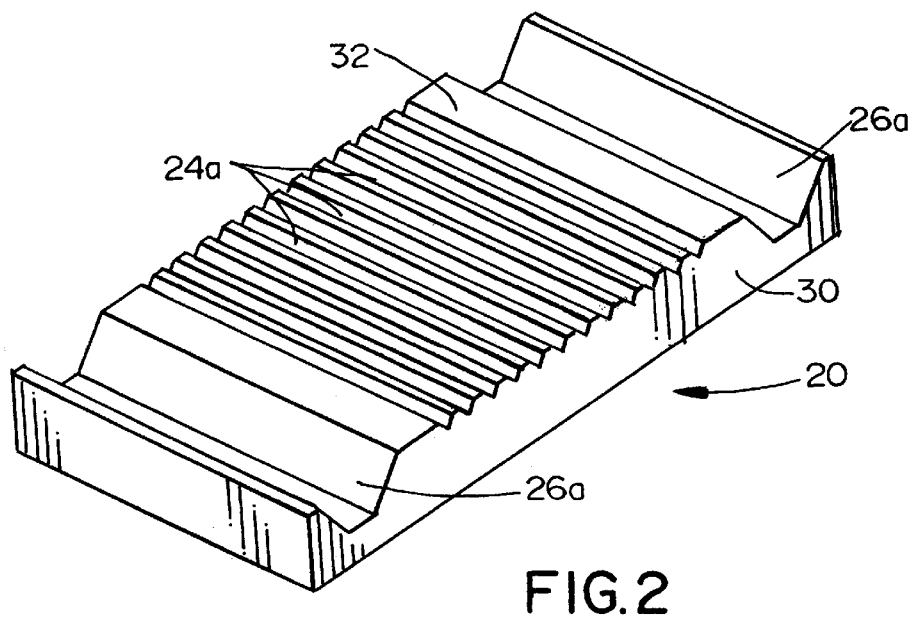
FIG. 2 is a perspective view of one of the clamping members of the ferrule.

FIG. 2 shows one of the clamping members 20, both clamping members being identical. Each clamping member includes a front flat face 30 which will lie flush with front face 16 of ferrule body 18. The clamping member has a planar inside surface 32 which opposes the planar inside surface of the other clamping member. A plurality of fiber half-passages 24a in the planar inside surfaces 32 of the clamping members combine to form the complete fiber passages 24 (FIG. 1). The fiber half-passages are two-sided or triangular troughs. A pair of pin half-passages 26a are formed in planar inside surfaces 32 of the opposing clamping members and combine to form the complete pin passages 26 (FIG. 1). The pin half-passages are three-sided.

Clamping members 20 may be fabricated of silicone or ceramic crystalline material within which fiber passages 24a and pin passages 26a can be formed with high precision and accuracy, such as by photo-chemical etching. Therefore, the alignment/tolerance problems described in detail in the "Background", above, are solved by the material and precision fabrication of clamping members 20. On the other hand, ferrule body 18 may be fabricated of a variety of materials, such as molded plastic.

Figure 3:
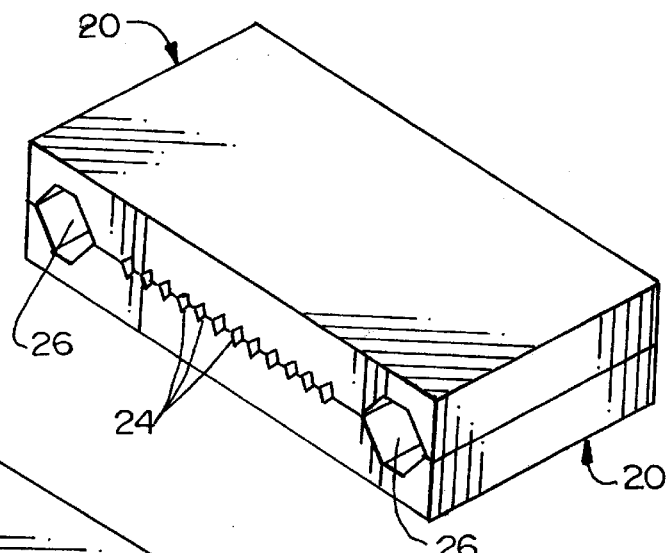
FIG. 3 is a perspective view of a pair of the clamping member removed from the ferrule body to facilitate the illustration.
Figure 4:
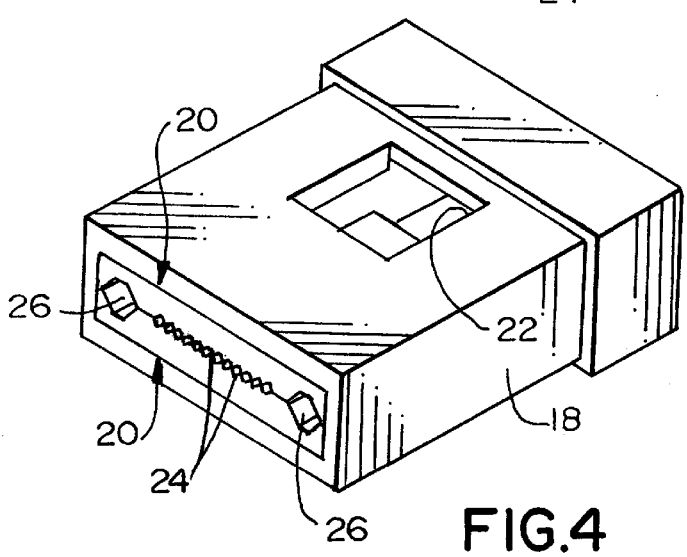
FIG. 4 is a perspective view similar to that of FIG. 3, with the body molded about the clamping members.

According to the method of the invention, a pair of the identical clamping members 20 are assembled in opposing juxtaposition as shown in FIG. 3, with the fiber half passages 24a (FIG. 2) and the pin half-passages 26a combining to form fiber passages 24 and pin passages 26, respectively, as the clamping members are mirror-images of each other. Ferrule body 18 then is overmolded about the juxtaposed clamping members as seen in FIG. 4. During overmolding, the clamping members may be held in a precision fixture with projections extending into the fiber and pin passages to maintain proper alignment of the respective half-passages. Therefore, after the subassembly of ferrule body 18 and clamping members 20 are removed, the overmolded ferrule body holds the clamping members in precise juxtaposition.

Before proceeding with the remaining steps of the method of the invention herein, FIG. 5 shows connector ferrule 10 with a pair of standard alignment pins 28 inserted into pin passages 26. Only two optical fibers 14 are shown in fiber passages 24 to facilitate an illustration of the configuration of the remaining passages, it being understood that a plurality of fibers typically will fill some or all of fiber passages 24. In this final assembly condition of ferrule 10, opposing planar inside surfaces 32 of clamping members 20 are in abutment so that there is no space therebetween as indicated by arrows "A". The diameters of alignment pins 28 and pin passages 26 are shown by double-headed arrow "D" or 0.699 mm. The diameters of fibers 14 and fiber passages 24 are shown by arrow "d" or 0.125 mm.

With the above understanding of the parameters in FIG. 5 with a fully assembled connector ferrule 10, reference now is made to FIG. 6 to describe the remaining steps in the method of the present invention. Specifically, after ferrule body 18 is overmolded about clamping members 20 as described above and in the subassembly of FIG. 4, this subassembly is placed in an appropriate fixture and a pair of spreader pins 40 (FIG. 6) are inserted into pin passages 26. The spreader pins are larger than alignment pins 28 so that the spreader pins are effective to spread clamping members 20 away from each other in the direction of arrows "X" (FIG. 6). Spreading the clamping members apart is effective to open fiber passages 24. This allows fibers 14 to be freely inserted into the fiber passages.

In comparing the spacings between the clamping members in the spread condition of FIG. 6 with the operative condition of FIG. 5, it can be seen that the opposing planar inside surfaces 32 of the clamping members have been spread apart from zero or abutting condition to a distance of 0.003 mm. The diameters of pin passages 26 have been opened from 0.699 mm to 0.703 mm which, in essence, is the enlarged diameters of spreader pins 40. Fiber passages 24 have been opened from 0.125 mm to 0.128 mm to allow the fibers to be freely inserted into the fiber passages. It should be understood that the specific dimensional parameters described above and shown in FIGS. 5 and 6 are not in any way intended to be limiting. These dimensional figures have been taken from but one example of a fully operative assembly and procedure.

After fibers 14 have been inserted into the opened fiber passages as described above in relation to FIG. 6, spreader pins 40 are removed to allow clamping members 20 to close back onto optical fibers 14. Fixing of the fibers in ferrule 10 by applying epoxy through opening 22 as described above in relation to FIG. 1, and cutting off and polishing fiber ends 14a, now can be accomplished with the fibers precisely positioned within fiber passages 24 in an efficient and simple assembly method. Of course, if alignment pins 28 are to be used in connector ferrule 10, the alignment pins are inserted into pin passages 26 and fixed within the ferrule by appropriate epoxy.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A method of fabricating a connector ferrule for a fiber optic cable which includes a plurality of generally parallel optical fibers, comprising the steps of:

providing a pair of ferrule clamping members which define a plurality of generally parallel fiber passages therebetween of diameters equal to or less than the diameters of optical fibers for receiving the optical fibers, the clamping members also defining at least one pin passage therebetween of a given diameter for receiving an alignment pin projecting from the ferrule to align the ferrule with an appropriate complementary connecting device;

molding a ferrule body about the clamping members;

inserting a spreader pin larger than said given diameter into said pin passage to spread the clamping members within the constraints of the molded body and, thereby, open said fiber passages;

inserting the optical fibers into the opened fiber passages; and removing the spreader pin and allowing the clamping members to close onto the optical fibers.

2. The method of claim 1, including providing said clamping members with opposing generally planar surfaces defining said fiber passages therebetween in a generally straight line for receiving the optical fibers of a fiber optic ribbon cable.

3. The member of claim 2, including providing fiber half-passages in each of said opposing planar surfaces combining to form the complete fiber passages.

4. The method of claim 2, including providing one of said pin passages spaced from each end of the line of fiber passages for receiving a pair of said spreader pins.

5. The method of claim 1, including providing one of said pin passages spaced from two diametrically opposite sides of the plurality of fiber passages for receiving a pair of said spreader pins.

6. The method of claim 1, including providing fiber half-passages in each clamping member combining to form the complete fiber passages.

7. A method of fabricating a connector ferrule for a fiber optic cable which includes at least one optical fiber, comprising the steps of:

providing a pair of ferrule clamping members which define a fiber passage therebetween for receiving the optical fiber and which define at least one pin passage therebetween of a given diameter;

positioning a ferrule body about the clamping members;

inserting a spreader pin larger than said given diameter into said pin passage to spread the clamping members and open the fiber passage;

inserting the optical fiber into the opened fiber passage; and removing the spreader pin and allowing the clamping members to close onto the optical fiber.

8. The member of claim 7, including providing a fiber half-passage in each clamping member combining to form the complete fiber passage.

9. The method of claim 7, including providing one of said pin passages spaced from two diametrically opposite sides of the fiber passage for receiving a pair of said spreader pins.

10. A method of fabricating a connector ferrule for a fiber optic cable which includes at least one optical fiber, comprising the steps of:

providing a pair of ferrule clamping members which define a fiber passage therebetween for receiving the optical fiber;

molding a ferrule body about the clamping members;

inserting a spreader member between the clamping members to spread the clamping members within the constraints of the molded body and, thereby, open said fiber passage;

inserting the optical fiber into the opened fiber passage; and removing the spreader member and allowing the clamping members to close onto the optical fiber.

11. The member of claim 10, including providing a fiber half-passage in each clamping member combining to form the complete fiber passage.

* * * * *